May 22, 1956  F. W. BOWIE ET AL  2,746,218
CYLINDRICAL GRINDING ATTACHMENT FOR SURFACE GRINDERS
Filed March 24, 1953  2 Sheets-Sheet 1
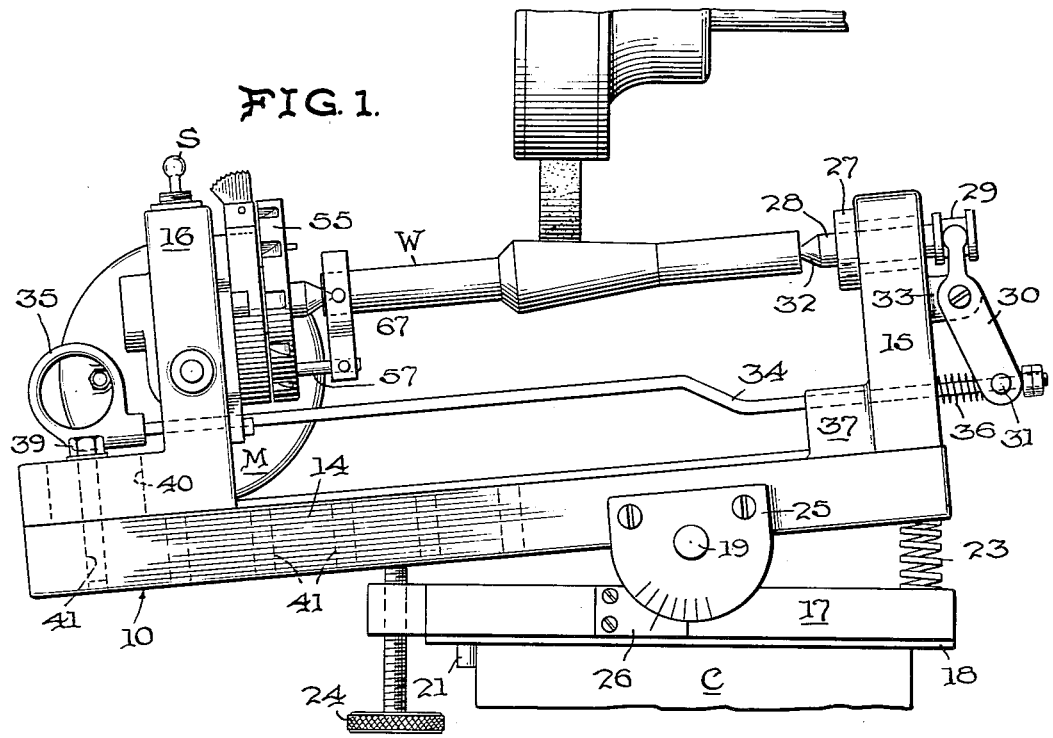
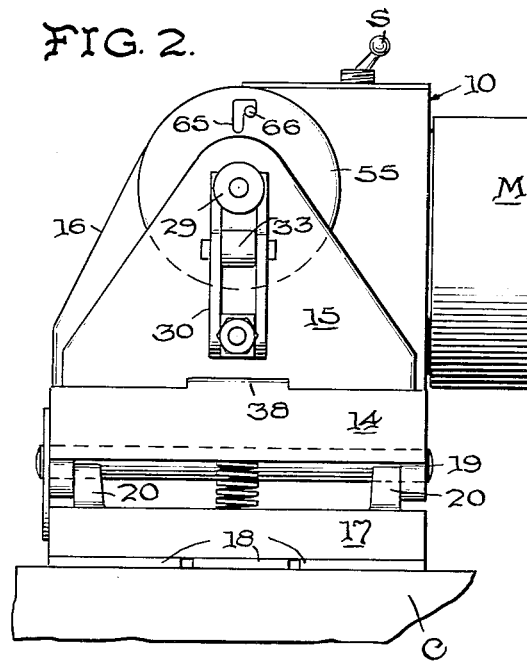
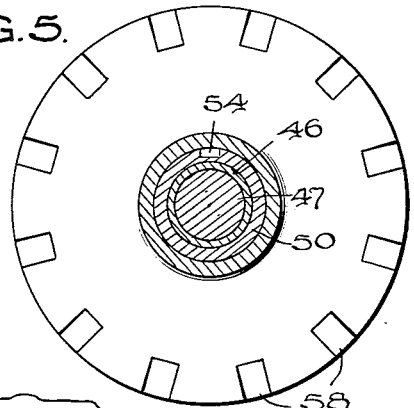
INVENTORS
FRANK W. BOWIE
EDWARD N. STURDEVANT
BY Raymond N. Matson
AGENT INVENTORS
FRANK W. BOWIE
EDWARD N. STURDEVANT
BY
Raymond N. Matson
AGENT No. 2,746,218
Patented May 22, 1956

2,746,218

CYLINDRICAL GRINDING ATTACHMENT FOR SURFACE GRINDERS

Frank W. Bowie and Edward N. Sturdevant, Binghamton, N. Y., assignors to Frank W. Bowie, Binghamton, N. Y.

Application March 24, 1953, Serial No. 344,432

1 Claim. (Cl. 51—237)

This invention relates generally to surface grinding machines and more particularly to a power driven, precision cylindrical grinding attachment therefor.

Attachments of this general type are known in the art but are usually characterized by certain inherent disadvantages. Among these are an unnecessary size and weight, poor design rendering the attachment impractical in use, a lack of a ready adjustability rendering the device unsuitable for the quantity production of work pieces of different sizes, and an unnecessarily high first cost.

Accordingly, the chief object of the present invention is to provide a precision grinding attachment which will obviate the above mentioned disadvantages characterizing known structures.

Another important object of the present invention is to provide an improved cylindrical grinding attachment for surface grinding machines which will rotatably or rigidly support work pieces in any desired angular position with respect to the grinding tool by a single adjusting means.

A further important object of the present invention is to provide an improved lightweight attachment of the type described which will permit ready indexing of the work pieces about their axis.

A still further important object of the present invention is to provide an improved attachment of the type described in which the head and tail stocks are relatively adjustable to accommodate different length work pieces and in which the operation of insertion of the pieces may be readily accomplished after initial adjustment of the head and tail stocks without loosening any bolts, etc.

Another important object of the present invention is to provide an improved power driven attachment of the type described in which the driving head is readily and disengageably connected with the power driven driving gear.

Other objects and advantages of the invention will become apparent during the course of the following description.

In the drawings we have shown one embodiment of our invention. In this showing:

Figure 1 is a side elevational view of the cylindrical grinding attachment comprising the present invention showing it operably mounted on the magnetic chuck of a surface grinding machine and angularly disposed with respect to the grinding tool or wheel so as to rotatably support a work piece for the grinding of a taper thereon;

Figure 2 is an end elevational view of the attachment;

Figure 5 is a fragmentary vertical sectional view of the head stock taken on the line 5—5 of Figure 3; and Figure 6 is a detail view to an enlarged scale showing a dog drivably connecting a work piece and the driving head stud.

Figure 3:
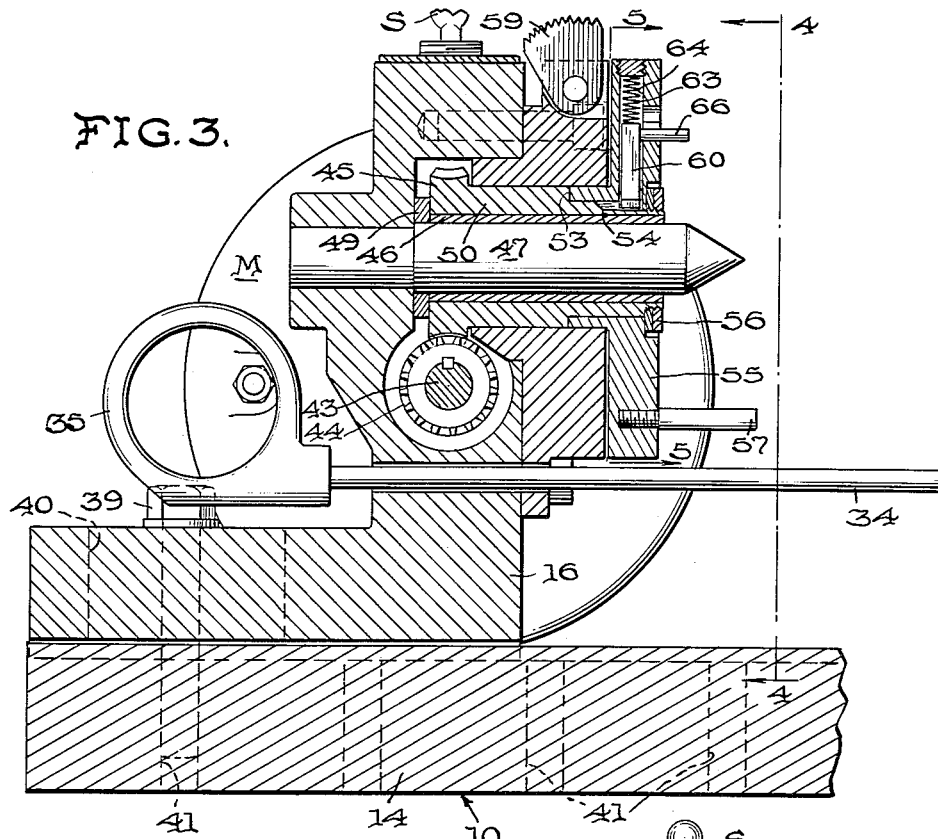
Figure 3 is a central longitudinal, vertical sectional view of the head stock of the attachment.

Referring to the drawings, numeral 10 designates the attachment as a whole which comprises a base 14, a tail stock 15 fixed thereto, and a head stock 16 slidably mounted on the base which is pivotally mounted on a supporting base plate 17.

The base plate 17 comprises a rectangular aluminum casting to the bottom of which are attached a plurality of spaced steel plates 18 so as to be magnetically held in operative position on the magnetic chuck C of the surface grinding machine bed. A pair of depending pins 21 enable the plate to be squarely mounted on the chuck C by engaging its sides.

The base 14 is pivotally mounted on the base plate 17 and substantially centrally thereof by means of a hardened steel bolt 19 arranged transversely therebetween and passing through spaced aligned ears 20 formed on the base and the base plate. A strong steel spring 23 is mounted between and fixed to the base 14 and the bed plate 17 adjacent one of their ends (Figure 1) and the relative angular position of the base and base plates is maintained and adjusted by means of a thumb screw 24 having fine threads and passing through an aperture in the other end of the base plate and bearing against the bottom of the base 14.

A quadrant 25 depends from the base 14 and cooperates with a sector 26 fixed to the base plate to indicate the relative angular position of the base and base plate. It is to be noted that the spring 23 is of such strength that grinding operations will not change the adjusted angular position.

The tail stock 15 and the base 14 are both aluminum castings and the former includes a bushing 27 for the reception of the dead center 28 which is preferably provided with a Carboloy tip 32. The opposite end of the dead center is provided with a double collar 29 for cooperation with angled bell crank arms 30 which are pivotally connected to the tail stock 15 by a stud 33. The lower ends of the bell crank arms 30 are pivotally connected at 31 to the end of an operating rod 34 which passes through aligned, centrally positioned apertures in the tail and head stocks and terminates in a ring 35.

A strong spring 36 is interposed between the tail stock and the pivot 31 to exert constant pressure on the work piece being held by the dead centers. It will be apparent that work pieces may be readily removed from or inserted into position between the dead centers of the head and tail stocks by merely pulling the ring 35 to the left (as viewed in Figure 1) against the spring 36 to retract the tail stock dead center. This is an important feature of the invention which enables the attachment to be used in the mass production of finished work pieces rather than for occasional pieces as in the prior art. The tail stock 15 is suitably braced by a transversely extending block 37 which is fixed thereto and to the base 14.

The upper surface of the base 14 is provided with a longitudinally extending tenon 38 which tracks in a corresponding recess in the bottom surface of the head stock 16 and guides its movement during adjustment of the distance between the head and tail stocks. The head stock 16 may be retained in adjusted position by means of a pair of laterally spaced bolts 39 extending through the slots 40 in the head stock into any of a plurality of threaded apertures 41 formed in the base 14.

The head stock 16 (Figure 3) is preferably an aluminum casting having a motor M fixed thereto which is controlled by a switch S. Power is supplied to the motor by means of a conventional cord and plug. The shaft 43 of the motor M has a worm gear 44 keyed thereto which meshes with a spur gear 45 having bearing on a bronze bushing 46 encircling the dead center 47 of the head stock. A washer 49 absorbs the thrust of the drive.

A sleeve 50 is fixed to or integral with the gear 45 and extends forwardly to include a portion of reduced diameter having a shoulder 53, a keyway 54 and a threaded end portion. A combination indexing and driving plate 55 is rotatably mounted on the sleeve 50 against the shoulder 53 by a nut 56 and the driving plate has a driving stud 57 projecting therefromm for a purpose which will become apparent.

A plurality of regularly spaced notches 58 are formed in the periphery of the drive plate 55 and these may be twelve in number so that their angular spacing is 30°. A latch 59 is pivotally mounted on the top of the head stock and is operative to lock the drive plate 55 in any indexed position when swung into a notch 58. When used to index a work piece to grind flats, hex, etc., the index plate rotates freely on the sleeve 50 and is not drivably connected therewith.

Figure 4:
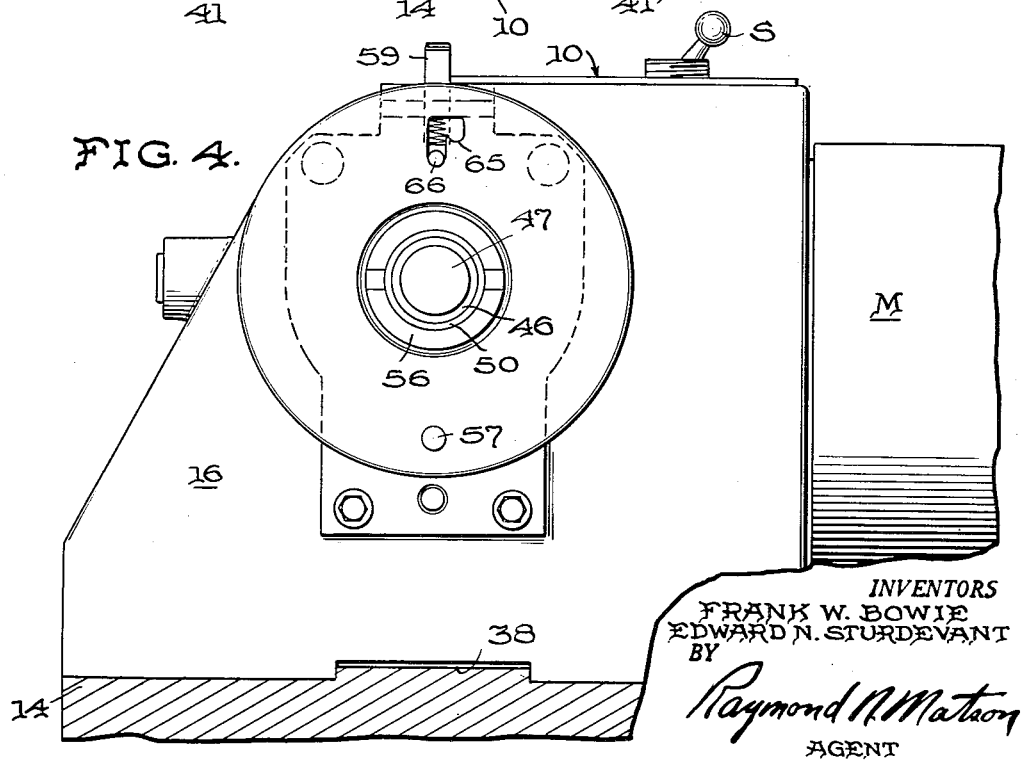
Figure 4 is an end elevational view thereof partly in section taken on the line 4—4 of Figure 3.

To enable the plate 55 to drive or rotate a work piece, the plate 55 is drivably connected with the keyway 54 by means of a strong stud pin 60 under the influence of a spring 63, the pin and spring being enclosed in a radially extending bore 64 in the drive plate. An L shaped slot 65 extends from the face of the plate 55 into communication with the bore for the reception of a lever 66 fixed to the pin 60 and adapted to move it radially outwardly and into the side notch from the positions shown in Figures 3 and 4 to that shown in Figure 2. Thus the drive plate 55 may be readily converted into an indexing plate by moving the pin 60 out of the keyway 54 to thus be disconnected from the motor M.

When the plate is to be used as a driver, a dog 67 (Figure 6) is clamped to a work piece W and to the drive stud 57. The pin 60 being engaged in the keyway 54, energization of the motor M will rotate the work piece which may be ground as desired. Tapers may be formed at either end or any part of the piece by adjusting the angle of the base 14 by means of the screw 24, the angle being indicated by the quadrant markings.

It will now be apparent that the present invention enables cylindrical grinding to be accomplished on a surface grinding machine and eliminates the need for a large, expensive and conventional cylindrical grinding machine. Furthermore, it enables hex, square or angle work to be done as well as cylindrical work. The attachment is light in weight but extremely sturdy and the dual pivotally connected bases for ready adjustment for taper grinding, the sliding head stock and its novel construction, and the retractable tail stock dead center which eliminates needless tightening and loosening of bolts, all comprise a highly improved construction capable of mass production of work pieces.

It is to be understood that the form of the invention herewith shown and described is to be taken as a preferred example of the same and that various changes in the shape, size and arrangement of parts may be resorted to without departure from the spirit of the invention or the scope of the subjoined claim.

We claim:

An attachment for surface grinders having a rotary tool and a work supporting bed relatively traversible in a predetermined plane comprising a base plate adapted to be fixed to the bed, a base pivotally mounted on said plate, a tail stock rigidly fixed to said base and including a dead center, a head stock slidably mounted on said base and including a dead center cooperating with said tail stock dead center to support work pieces therebetween, means for rotating the work pieces, one of said dead centers being retractable with respect to its stock to permit the insertion and removal of work pieces, and control means mounted adjacent said head stock and operable to retract said dead center, said head and tail stocks including apertures, and a rod slidably mounted in said apertures and operably connected with said retractable dead center and said control means.

References Cited in the file of this patent
UNITED STATES PATENTS

| 727,355 | Hansen | May 5, 1903 |
| 927,036 | Gail | July 6, 1909 |
| 1,336,533 | Nicholaysen | Apr. 13, 1920 |
| 1,341,541 | Buckman | May 25, 1920 |
| 1,687,725 | Hanson | Oct. 16, 1928 |
| 1,749,328 | Einstein | Mar. 4, 1930 |
| 1,759,044 | De Vlieg | May 20, 1930 |
| 2,059,753 | Scott | Nov. 3, 1936 |
| 2,262,099 | De Vlieg | Nov. 11, 1941 |
| 2,428,248 | Strong | Sept. 30, 1947 |
| 2,527,778 | Trocki | Oct. 31, 1950 |